US012254414B2

United States Patent
Nilsson

(10) Patent No.: US 12,254,414 B2
(45) Date of Patent: Mar. 18, 2025

(54) AUTOENCODING GENERATIVE ADVERSARIAL NETWORK FOR AUGMENTING TRAINING DATA USABLE TO TRAIN PREDICTIVE MODELS

(71) Applicant: Tobii AB, Danderyd (SE)

(72) Inventor: Mårten Nilsson, Danderyd (SE)

(73) Assignee: Tobii AB, Danderyd (SE)

( * ) Notice: Subject to any disclaimer, the term of this patent is extended or adjusted under 35 U.S.C. 154(b) by 1127 days.

(21) Appl. No.: 17/056,272

(22) PCT Filed: May 13, 2019

(86) PCT No.: PCT/SE2019/050420
§ 371 (c)(1),
(2) Date: Nov. 17, 2020

(87) PCT Pub. No.: WO2019/221654
PCT Pub. Date: Nov. 21, 2019

(65) Prior Publication Data
US 2021/0256353 A1 Aug. 19, 2021

Related U.S. Application Data

(60) Provisional application No. 62/672,985, filed on May 17, 2018.

(51) Int. Cl.
G06N 3/04 (2023.01)
G06F 18/214 (2023.01)
G06N 3/045 (2023.01)
G06N 3/047 (2023.01)
G06N 3/084 (2023.01)
G06N 3/088 (2023.01)

(52) U.S. Cl.
CPC ........... *G06N 3/088* (2013.01); *G06F 18/214* (2023.01); *G06N 3/045* (2023.01); *G06N 3/047* (2023.01); *G06N 3/084* (2013.01)

(58) Field of Classification Search
CPC ........ G06N 3/088; G06N 3/047; G06N 3/045; G06N 3/084; G06F 18/214
USPC ............................................................ 706/16
See application file for complete search history.

(56) References Cited

U.S. PATENT DOCUMENTS

| 10,127,680 | B2 * | 11/2018 | Lagun | ....................... G06T 7/11 |
| 10,846,877 | B2 * | 11/2020 | Lagun | ....................... G06T 7/74 |
| 2017/0372487 | A1 * | 12/2017 | Lagun | ....................... G06T 7/33 |

(Continued)

OTHER PUBLICATIONS

International Search Report and Written Opinion of PCT/SE2019/050420.

*Primary Examiner* — Maikhanh Nguyen
(74) *Attorney, Agent, or Firm* — Noréns Patentbyrå AB

(57) ABSTRACT

Techniques for using a deep generative model to generate synthetic data sets that can be used to boost the performance of a discriminative model are described. In an example, an autoencoding generative adversarial network (AEGAN) is trained to generate the synthetic data sets. The AEGAN includes an autoencoding network and a generative adversarial network (GAN) that share a generator. The generator learns how to the generate synthetic data sets based on a data distribution from a latent space. Upon training the AEGAN, the generator generates the synthetic data sets. In turn, the synthetic data sets are used to train a predictive model, such as a convolutional neural network for gaze prediction.

16 Claims, 10 Drawing Sheets

(56) References Cited

U.S. PATENT DOCUMENTS

| | | | |
|---|---|---|---|
| 2019/0080474 A1* | 3/2019 | Lagun | G06T 7/74 |
| 2020/0151509 A1* | 5/2020 | Sunkavalli | G06V 10/776 |
| 2020/0341466 A1* | 10/2020 | Pham | G06V 20/56 |
| 2020/0348755 A1* | 11/2020 | Gebauer | G06F 18/2413 |
| 2021/0269046 A1* | 9/2021 | Hashimoto | G06N 3/045 |

\* cited by examiner

AUTOENCODING GENERATIVE ADVERSARIAL NETWORK FOR AUGMENTING TRAINING DATA USABLE TO TRAIN PREDICTIVE MODELS

TECHNICAL FIELD

This disclosure relates to an autoencoding generative adversarial network (AEGAN). In an example, latent codes are mapped to a latent space based on the training of this network. Upon completion of the training, a generator network of the AEGAN augments training data based on the latent space. The augmented training data is in turn used to train predictive models, such as a gaze prediction model implemented as a neural network.

BACKGROUND

Interaction with computing devices is a fundamental action in today's world. Computing devices, such as personal computers, tablets, smartphones, are found throughout daily life. In addition, computing devices that are wearable, such as wearable headset devices (e.g., virtual reality headsets and augmented reality headsets), are becoming more popular. The systems and methods for interacting with such devices define how they are used and what they are used for.

Advances in eye tracking technology have made it possible to interact with a computing device using a person's gaze information. In other words, the location on a display the user is gazing at. This information can be used for interaction solely, or in combination with a contact-based interaction technique (e.g., using a user input device, such as a keyboard, a mouse, a touch screen, or another input/output interface).

Previously proposed interaction techniques using gaze information can be found in U.S. Pat. No. 6,204,828, United States Patent Application Publication 2013/0169560, U.S. Pat. No. 7,113,170, United States Patent Application Publication 2014/0247232, and U.S. Pat. No. 9,619,020. The full specification of these patents and applications are herein incorporated by reference.

Generally, gaze-based interaction techniques rely on detecting a gaze of a user on a gaze point. Convolutional neural networks have been proposed to predict the gaze. A convolutional neural network can be trained based on a set of training images to perform the gaze prediction. However, the accuracy of the gaze prediction depends on the image set. Furthermore, overfitting can occur if the image set is not a diverse set of training images. Hence, the performance of the convolutional neural network can be significantly improved when a large and diverse set of training images is available for the training.

SUMMARY

Systems, methods, and computer-readable storage media storing computer-readable instructions for improving the training of predictive models, such as a convolutional neural networks trained for gaze prediction, are illustrated. In an example, a user image is provided to a gaze prediction model. The user image shows at least a user eye. In response, a prediction of a user gaze is received from the gaze prediction model based on the user image. The gaze prediction model is trained based on an augmented training image that is generated by a generator network. The generator network is trained to generate the augmented training image based on a training of an autoencoder network and a generative adversarial network. The autoencoder network comprises the generator network and an encoder network. The generative adversarial network comprises the generator network and a discriminator network. A loss function for training the generator network comprises a first loss term associated with training the encoder network and a second loss term associated with training the generative adversarial network.

In an example, the training of the autoencoder network and the generative adversarial network comprises providing a training image to the encoder network, mapping, to a latent space, a code vector that is generated by the encoder network based on the training image, computing a loss of the encoder network based on a comparison of the training image and a reconstructed image, and updating parameters of the encoder network based on the loss of the encoder network. The reconstructed image is generated by the generator network based on the code vector. The training of the autoencoder network and the generative adversarial network further comprises providing, to the discriminator network, the training image and a fake image, wherein the fake image is generated by the generator network based on the latent space, computing a loss of the discriminator network based on predictions of the discriminator network whether each of the training image and the fake image is real or fake, updating parameters of the discriminator network based on the loss of the discriminator network. In addition, the training of the autoencoder network and the generative adversarial network further comprises computing the loss of the generator network based on the first loss term associated with training the encoder network and the second loss term associated with training the generative adversarial network, and updating parameters of the generator network based on the loss of the generator network. The first loss term comprises the loss of the encoder network. The loss of the discriminator network is computed by allocating a zero to a prediction of the discriminator network that the fake image is fake. The second loss term used to compute the loss of the generator network is computed by allocating a one to a prediction of the discriminator network that the fake image is fake.

In a further example, the loss of the encoder network comprises a drift loss term that confines the code vector to a compact subspace of the latent space. Furthermore, the training image is associated with an annotation. The code vector is generated by the encoder network based further on the annotation of the training image.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
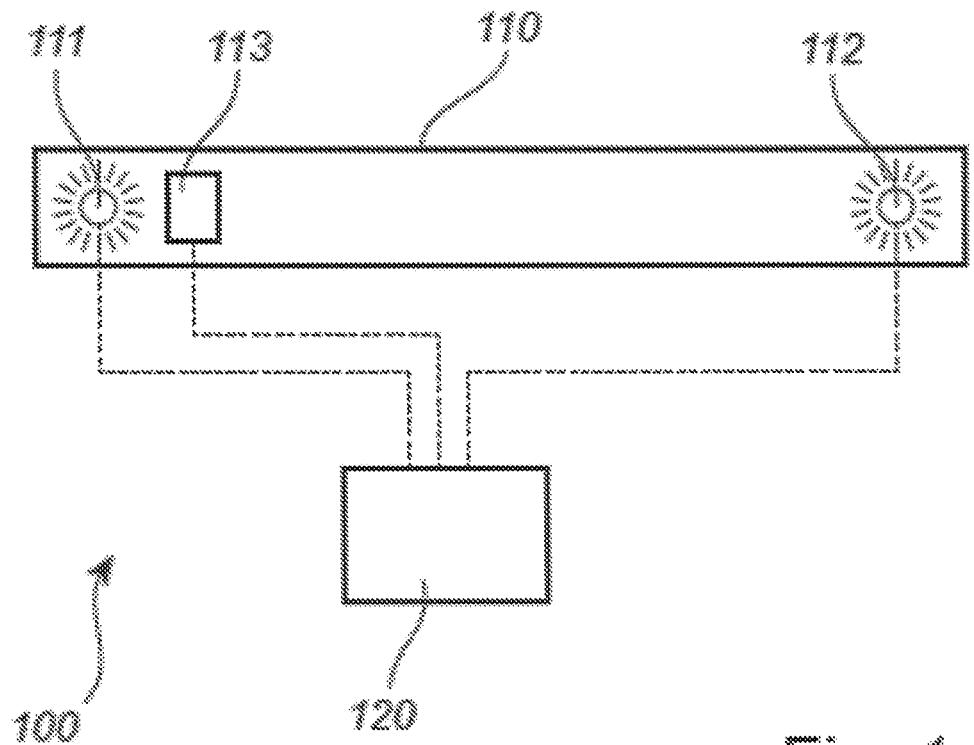
FIG. 1 illustrates an embodiment of an eye tracking system, according to the present disclosure.

Embodiments of the present disclosure relate to an autoencoding generative adversarial network (AEGAN). In an example, the AEGAN is used to automatically augment training data usable to train a predictive model. For instance, the predictive model is a gaze prediction model implemented as a convolutional neural network. Because the training data is augmented, a larger and more diverse training dataset is available, thereby the training improves the performance of the predictive model.

In an embodiment, the AEGAN is an example of a generative model and the predictive model is an example of a discriminative model. A generative model refers to a model that models a distribution of data, thereby allowing sampling from the modeled data distribution. In comparison, a discriminative model refers to a model that models information that can be extracted from the data.

Various attempts have been made to use generative models for generating synthetic data sets (e.g., augmented training data) that can be used to boost the performance of discriminative models. A common technical challenge includes training stability, quality, and diversity. In particular, a generative model is trained to generate a synthetic data set. However, depending on how the generative model is coupled with a predictive model, the training may not converge (e.g., in the case of a generative adversarial network (GAN), the gradient descent can get stuck), the quality of the synthetic data may be much lower of the actual training data that should be augmented, and/or the synthetic data is not diverse enough to avoid overfitting. In addition, certain types of generative models suffer from limited sealability or cannot handle high dimensional data. These and other technical challenges are further described in connection with the next figures.

To overcome such technical challenges, the AEGAN includes an autoencoder network and a GAN that share a same generator (this generator can be referred to also as a decoder within the context of the autoencoder network). In addition to the generator, the autoencoder network includes an encoder, while the GAN includes a discriminator. Each of the encoder, generator, and discriminator is an artificial neural network and can also be referred to herein as an encoder network, a generator network (or decoder network), and a discriminator network, respectively. In an example, the autoencoder network is implemented as a denoising autoencoder that takes a partially corrupted input whilst training to recover the original undistorted input. The GAN is implemented by a system of two neural networks (one corresponding to the generator and one corresponding to the discriminator) contesting with each other in a zero-sum game framework.

The AEGAN is trained to generate a synthetic data set, To do so, the autoencoder network and the GAN are trained simultaneously. However, the adversarial loss of the GAN is not used to train the autoencoder network. Instead, the generator (that is shared between the two networks) is trained based on an adversarial loss term associated with the discriminator of the GAN and a loss term associated with the encoder of the autoencoder network. By using the two loss terms, the training of the AEGAN has been observed to be stable.

Also during the training of the AEGAN, the encoder generates code vectors from real training data. The code vectors are mapped to a latent space. The generator is trained not only to reconstruct the real training data, but also to synthesize fake data in an attempt to fool the discriminator into predicting that the fake data is real data. The training is iteratively repeated, thereby updating the data distribution modeled in the latent space. Upon completion of the AEGAN's training, the data distribution allows the generator to generate high quality and diverse synthetic training data for use in the training of the predictive model. In turn, because high quality and diverse synthetic training data is available for the training of the predictive model, the performance of this model is significantly improved upon the completion of its training.

To illustrate, consider an example of training a gaze prediction model implemented as a convolutional neural network. An original set of training images (e.g., 10,000 of such images) is available. Each training image shows a user eye and the gaze prediction model should be trained to locate pupil(s), among other things. In this example, the training involves two stages. In the first stage, the original set is augmented by the AEGAN to also include 90,000 augmented training images. In the second stage, the 100,000 training images (e.g., the original 10,000 training images and the 90,000 augmented training images) are used to train the gaze prediction model.

In the first stage, subsets of the training images are input to the encoder of the autoencoder network in batches (e.g., each batch includes between one and ten training images, for instance). For each training image, the encoder generates a high dimensional latent code vector (e.g., having one hundred and twenty-eight dimensions). The code vector is mapped to a latent space. The generator generates a reconstructed image by reconstructing the training image based on the code vector. A loss of the encoder is computed by comparing the similarity of the training image and the reconstructed image (e.g., the similarity is computed as a Manhattan distance between the two images). The data distribution in the latent space is also sampled to generate a sample code vector. The generator generates a fake training image based on the sample code vector. This fake training image and the training image (e.g., the original, real training image) are input to the discriminator of the GAN. The discriminator outputs a first prediction of whether the fake training image is real or fake and a second prediction of whether the original, real training image is real or fake. A loss of the discriminator is computed based on the two predictions. In addition, a loss of the generator is computed and includes a first loss term associated with the training of the encoder and a second loss term associated with the training of the discriminator. For instances, the first loss term is the loss of the encoder. The second loss term depends on the first prediction of the discriminator (e.g., this loss term is set to zero if the discriminator incorrectly predicts that the fake training image is real and to one otherwise; reflecting the strategy that the generator should be trained to fool the discriminator to make the incorrect predictions by improving the quality of the fake training images). Backpropagation that relies on a gradient descent is used to update the parameters of each of the encoder, generator, and discriminator (e.g., their hyperparameters) based on the respective loss. This process is iteratively repeated for a number of iterations. Thereafter, the next batch of training images is input to the encoder, and so on and so forth.

Upon completion of the first stage, the latent space represents a data distribution of the 10,000 original, real training images. The discriminator and, optionally, the encoder need no longer be used in the second stage. Instead, the generator generates the 90,000 augmented training images based on the data distribution. For example, the data distribution is sampled to generate 90,000 sample code vectors and these vectors are input to the generator. In turn, the generator generates an augmented training image based on each inputted sample code vectors. The 10,000 original, real training images and the 90,000 augmented training images are input during the training of the gaze prediction model, where this training is iterative and minimizes a loss function of the gaze prediction model (e.g., for predicting pupil location, this loss function can be defined based on a distance between a location of a pupil in an image and a predicted location of the pupil from the image).

In the interest of clarity of explanation, certain embodiments of the present disclosure are described in connection with a gaze prediction model and training images. However, the embodiments are not limited as such. Instead, the embodiments similarly apply to training a discriminative model by augmenting the training data. The AEGAN described in the embodiments is trained for the data augmentation and the generator of the AEGAN is used to augment the training data upon completion of the AEGAN's training.

Also in the interest of clarity of explanation, a description of eye tracking based on gaze information is provided herein below in FIGS. 1-4. Thereafter, the use of the AEGAN for the training is a gaze prediction system is described in connection with FIGS. 5-12.

Referring now to the figures, FIG. 1 shows an eye tracking system 100 (which may also be referred to as a gaze tracking system), according to an embodiment. The system 100 comprises illuminators 111 and 112 for illuminating the eyes of a user, and an image sensor 113 for capturing images of the eyes of the user. The illuminators 111 and 112 may for example, be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited to be an IR camera, a depth camera, or a light-field camera. The shutter mechanism of the image sensor can be either a rolling shutter or a global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example, take turns to illuminate the eye, so that every first image is a bright pupil image, and every second image is a dark pupil image.

The eye tracking system 100 also comprises circuitry 120 (for example including one or more processors) for processing the images captured by the image sensor 113. The circuitry 120 may for example, be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
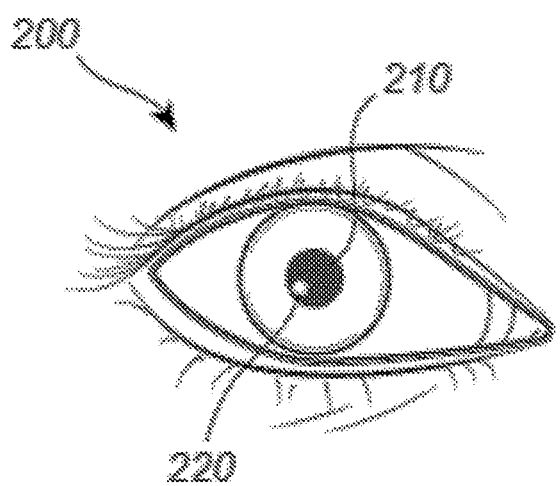
FIG. 2 illustrates an example of an image of an eye captured by an image sensor, according to an embodiment.

FIG. 2 shows an example of an image of an eye 200, captured by the image sensor 113, The circuitry 120 may for example, employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may, for example, be employed for remote eye tracking (for example in a personal computer, a smart phone, or integrated in a vehicle) or for wearable eye tracking (such as in virtual reality glasses or augmented reality glasses).

Figure 3:
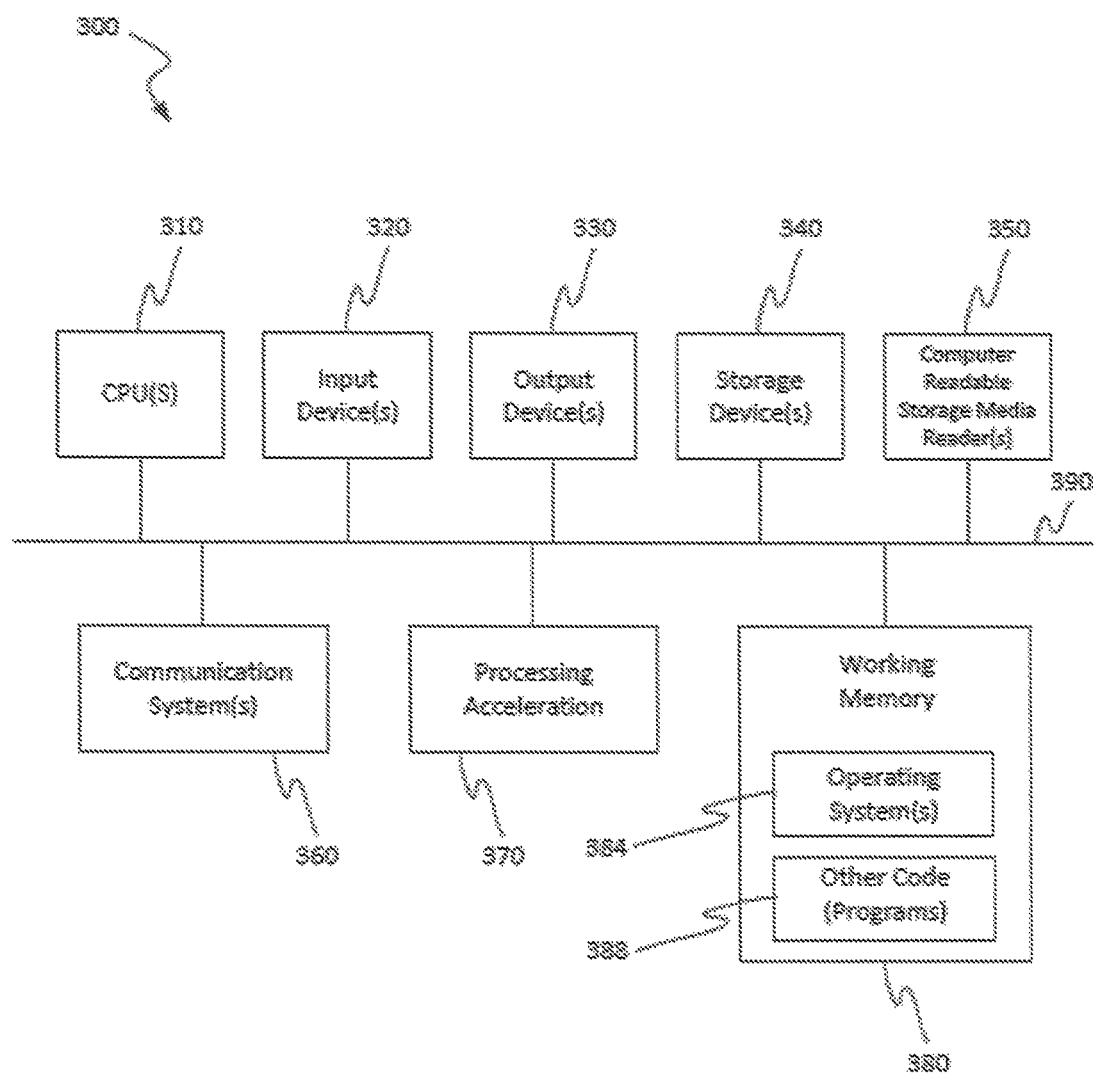
FIG. 3 depicts a block diagram illustrating a specialized computer system, according to an embodiment.

FIG. 3 is a block diagram illustrating a specialized computer system 300 in which embodiments of the present disclosure may be implemented. This example illustrates a specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage devices 340. By way of example, storage device(s) 340 may be disk drives, optical storage devices, solid-state storage devices such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device. Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Figure 4:
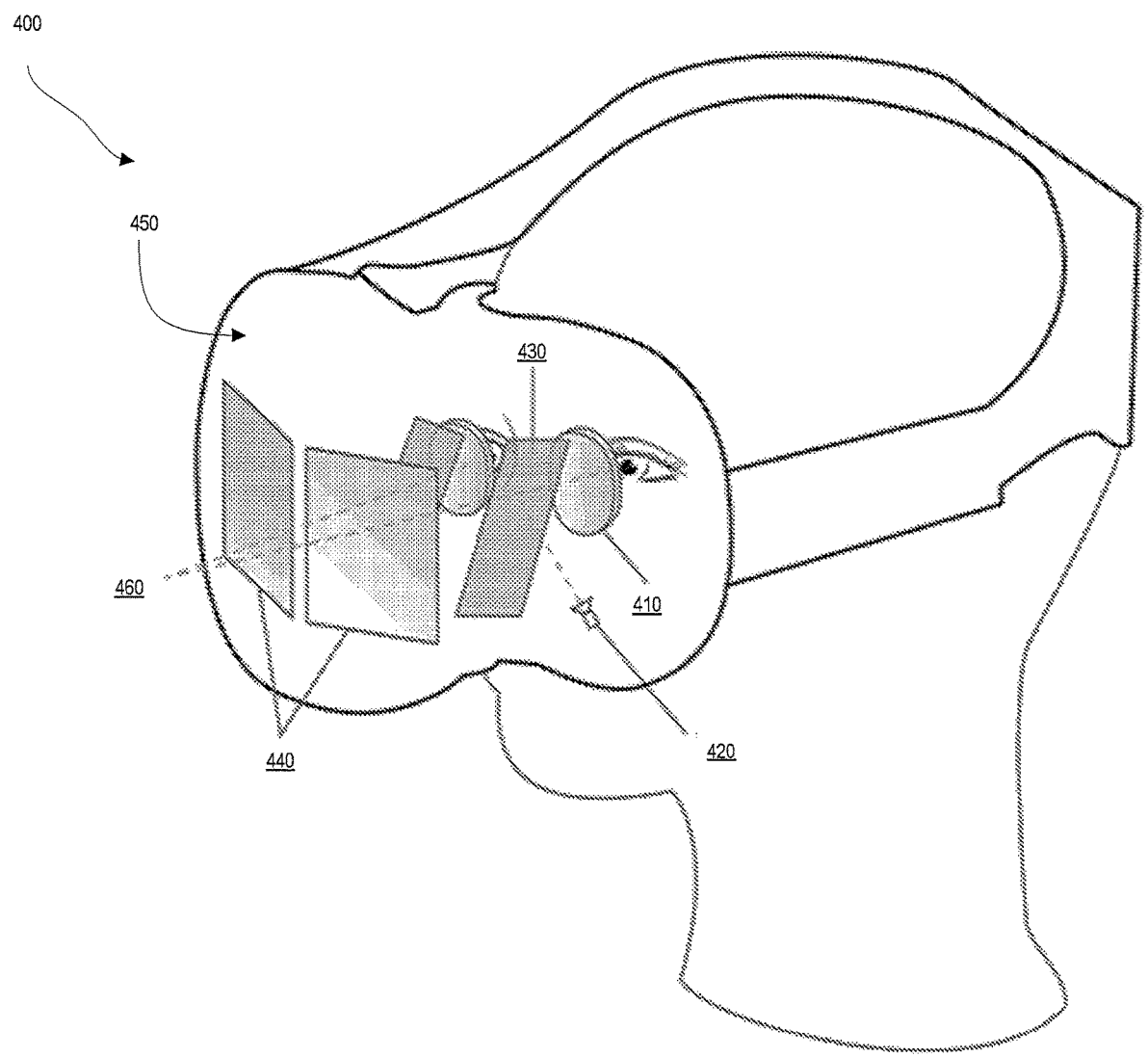
FIG. 4 shows an example of a wearable computing device that implements components of an eye tracking system, according to an embodiment.

FIG. 4 shows an example of a wearable computing device 400 that implements some or all of the above components of an eye tracking system as described in connection with FIGS. 1-2. The wearable computing device 400 can be a VR headset or an AR headset that can be worn by a user. As illustrated, the wearable computing device 400 includes a set of lenses 410, such as Fresnel lenses, a set of cameras 420, a set of hot mirrors 430, and a set of displays 440. The camera 420 can include the image sensors 113 of FIG. 1. Although not shown in FIG. 4, the wearable computing device 400 can also include a set of illuminators and processing circuitry. These and other components can be integrated within a housing 450 of the wearable computing device 400. In this way, upon the user mounting the wearable computing device 400 on his or her head, the set of lenses 410 would be relatively close to the user's eyes and the set of displays would be relatively far from the user's eye, and the remaining components may be located in between. The arrangement of these components allows the detection of the user's gaze point in three-dimensional virtual or real space.

Herein next, the use of an AEGAN with a gaze prediction model is described.

Figure 5:
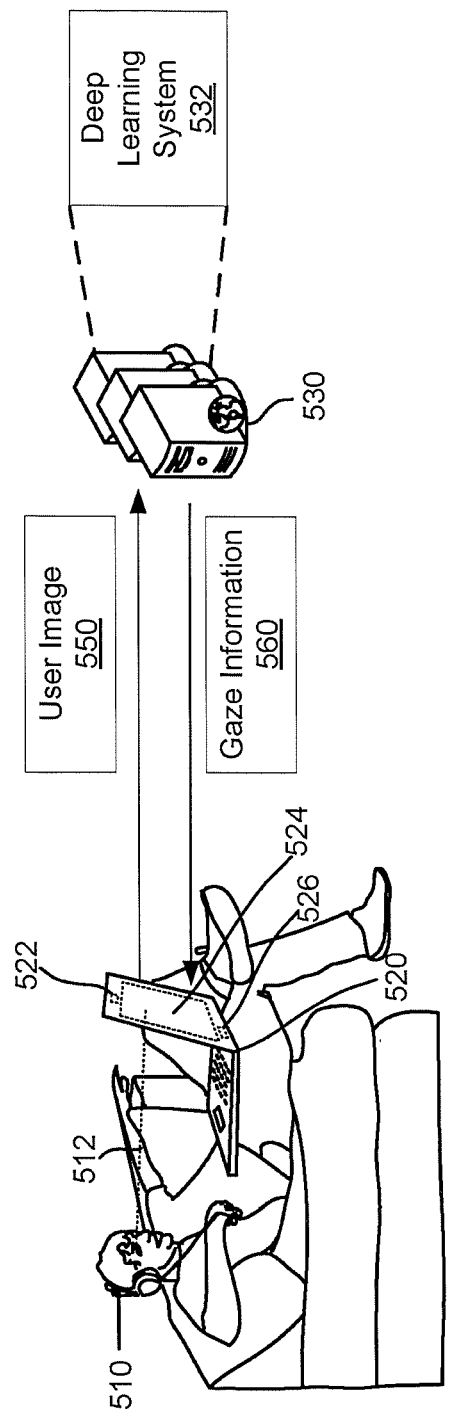
FIG. 5 illustrates an example of a computing environment for gaze prediction based on a deep learning system, according to an embodiment.

FIG. 5 illustrates an example of a computing environment for predicting gaze based on a deep learning system, according to an embodiment. As illustrated, a user 510 operates a computing device 520 that tracks the gaze 512 of the user 510. To do so, the computing device 520 is, in an example, in communication with a computer server 530 that hosts a deep learning system 532. The computing device 520 sends, to the computer server 530 over a data network (not shown), a user image 550 showing the user eyes while the user 510 is gazing. The computer server 530 inputs this user image 550 to the deep learning system 532 that, in response, predicts the gaze 512. The computer server 530 sends gaze information 560 about the gaze 512 back to the computing device 520 over the data network. The computing device 520 uses this gaze information 560 to provide a gaze-based computing service to the user 510.

Although FIG. 5 shows the computer server 530 hosting the deep learning system 532; the embodiments of the present disclosure are not limited as such. For example, the computing device 520 can download code and host an instance of the deep learning system 532 (or certain networks therefrom such as a trained convolutional neural network available to perform gaze predictions), In this way, the computing device 520 relies on this instance to locally predict the gaze 512 and need not send the user image 550 to the computer server 530. In this example, the computer server 530 (or some other computer system connected thereto over a data network) can train the deep learning system 532 and, provide an interface (e.g., a web interface) for downloading the code of this deep learning system 530 to computing devices, thereby hosting instances of the deep learning system 530 on these computing devices.

In an example, the computing device 520 includes a camera 522, a screen 524, and a gaze application 526. The camera 522 generates the user image 550 that shows the user eyes while gazing, for instance, at the screen 524. The gaze application 526 can process the user image 550 for inputting to the deep learning system 532 (whether remote or local to the computing device 520) and can process the gaze information 560 about the gaze to support various gaze-related functions (e.g., to control and manipulate displayed objects on the screen 524 based on the gaze information 560).

In an example, the deep learning system 532 includes an AEGAN and a gaze prediction model. This gaze prediction model can be implemented as a convolutional natural network. The AEGAN is trained to augment training images. The augmented training images are then used to train the convolutional natural network to predict gaze information. Accordingly, the user image 550 received from the computing device 520 is input to the trained convolutional neural network and the gaze information 560 is output from the training convolutional neural network in response to this image 520. An augmented training image refers to a training image generated based on data distribution in a latent space, where the data distribution is generated based on one or more original training images. Similarly, augmented training data refers to training data generated based on data distribution in a latent space, where the data distribution is generated based on an original set of training data. A training image and an augmented training image are examples of training data and augmented training data, respectively.

Figure 6:
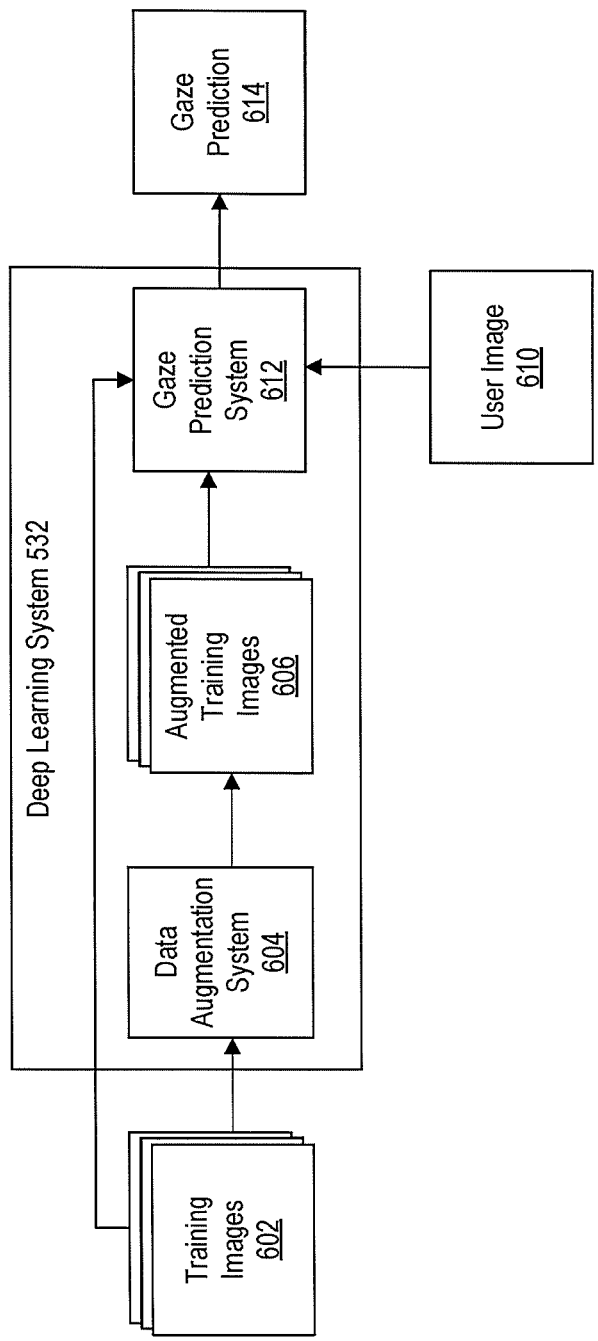
FIG. 6 illustrates an example of a deep learning system for gaze prediction, according to an embodiment.

FIG. 6 illustrates an example of a deep learning system for predicting gaze, such as the deep learning system 532 of FIG. 5. In some embodiments, the deep learning system includes a data augmentation system 604 and a gaze prediction system 612 and is hosted on a computer server. In an example, the data augmentation system 604 is implemented as or hosts an AEGAN that includes an autoencoder network and a GAN that share a generator, as further described in connection with the next figures. The gaze prediction system 612 is implemented as or hosts a convolutional neural network.

The computer server accesses training images 602 from, for example, local memory or alternatively from a remote system. Each training image represent a real image (e.g., one not synthesizes by the data augmentation system 604) and can be annotated. For instance, one or more annotations are added to metadata of a training image and are used as a training labels. For example, to train for predicting a pupil location, an annotation may identify the location of a pupil in a corresponding training image.

In some embodiments, the computer server inputs the training images 602 to the data augmentation system 604. In turn, the data augmentation system 604 models a data distribution of the training image 602 and generates and outputs augmented training images 606 based on the data distribution. The augmented training images 606 can be stored in the local memory or sent to the remote system for storage.

Furthermore, the computer server inputs the augmented training images 606 and, optionally, the training images 602 to the gaze prediction system 612. The gaze prediction system 612 is trained based on this input to predict gaze. For instance, the gaze prediction system 612 is trained to predict a pupil's location based on minimizing a loss function of the gaze prediction system 612. This loss function can be computed based on distance between a location of a pupil in an image (e.g., a training image or an augmented training image) and a predicted location of the pupil from the image.

Upon completion of the training of the gaze prediction system 612, the computer server inputs a user image 610 to the gaze prediction system 612. In response, the computer system receives a gaze prediction 614 from the gaze prediction system 612.

Figure 7:
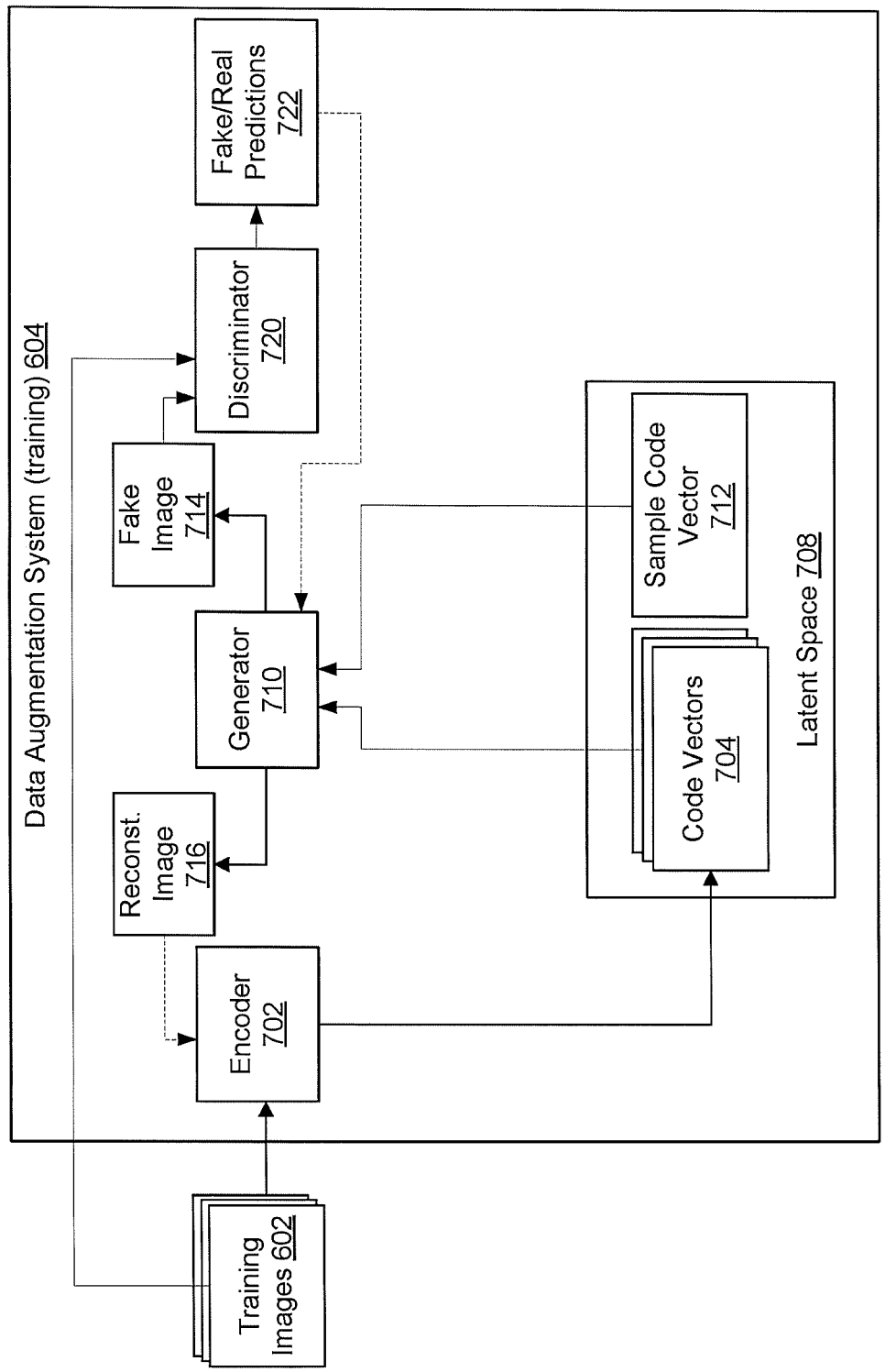
FIG. 7 depicts an example of training a data augmentation system, according to an embodiment.

FIG. 7 depicts an example of training the data augmentation system 604, according to an embodiment. The data augmentation system 604 includes an encoder 702, a generator 710, and a discriminator 720. In an example, each of the encoder 702, generator 710, and discriminator 720 is implemented as an artificial neural network. The data augmentation system 604 is trained such that a data distribution is generated from the training images 602 and mapped to a latent space 708. For instance, the data distribution includes high dimensional code vectors 704 (e.g., one hundred twenty-eight dimensional vectors) that belong to the latent space 708 and each of which correspond to one of the training images 602. During the training, the encoder 702 learns to generate the code vectors 704, the generator 710 learns to reconstruct the training images from the code vectors 704 and to generate fake images based on sampling of the code vectors 704, and the discriminator 720 learns to discriminate between a training image (e.g., a real image corresponding to one of the training images 602) and a fake image generated by the generator 710.

In an example, an input to the encoder 702 is a training image "x" and, optionally, an annotation "y" (e.g., a training label), and an output therefrom is a code vector "z" of the latent space "Z", where x,y→z=E(x,y) and "E" represents the encoder's 702 function of mapping the training input to the code vector "z." The training image "x" and the annotation "y" are referred to herein as a training input "x,y." The encoder 702 is trained according to a loss function $\mathcal{L}_E$. The loss function $\mathcal{L}_E$ is a function of a similarity between the training input "x,y" and a reconstructed training output "x̂,y" (illustrated in FIG. 7 as a reconstructed image 716) generated by the generator from the code vector "z," where x̂,y=G(z), "x̂,y" represents the reconstructed training image and the reconstructed annotation, and "G" represents the generator's 710 function of mapping the code vector "z" to the training input "x,y." In addition, the loss function $\mathcal{L}_E$ includes a drift loss term to confine the code vectors 704 to a compact subspace of the latent space 708 (e.g., such that the distribution of the code vectors fall within the compact subspace). For instance, the similarity is a Manhattan distance (or an L1 pixelwise comparison) and drift loss function is loss function ReLU(|z|−1). Accordingly, $\mathcal{L}_E=|(x,y)-(\hat{x},y)|_1+\text{ReLU}(|z|-1)$.

In an example, two inputs are provided to the generator 710 and two outputs are received back from the generator 710, where one set of input and output corresponds to the decoding of the generator 710 within the autoencoder network, and where the other set of input and output corresponds to data synthetization of the generator 710 within the GAN. For instance, a code vector "z" of the latent space 708 "Z" is input to the generator 710. In response, the generator 710 generated a reconstructed image 716 x̂,y=G(z). A similarity between this reconstructed image 716 and the corresponding training image "x,y" is computed and used in the encoder's 702 loss function $\mathcal{L}_E$ as explained herein above (illustrated in the figures with a dashed arrow from the reconstructed image 716 to the encoder 702). The other input to the generator 710 is a sample code vector 712 "z̃." This sample code vector 712 "z̃" is generated based on, for example, a normal distribution "N" (or some other sampling method) from the data distribution in the latent space 708, where z̃~N(0,1). The corresponding output from the generator 710 is a fake image 714 that can be expressed as x̄,y, where x̄,y=G(z̃). The generator 710 is trained according to a loss function $\mathcal{L}_G$ that includes a first loss element associated with the training of the encoder and a second loss term associated with the training of the discriminator 720. The loss function $\mathcal{L}_G$ is further described herein below following the description of the discriminator 720.

In an example, an input to the discriminator is the fake image 714 (e.g., "x̄,y") and a training image "x,y" (e.g., one of the training images 602), and an output therefrom are fake/real predictions 722 of whether each of the fake image 714 and the training image is real or fake. For example, a correct prediction of the fake image 714 as being fake is given a first value (e.g., a "zero"), an incorrect prediction of the fake image 714 as being real is given a second value (e.g., a "one"), a correct prediction of the training image as being real is given the second value (e.g., the "one"), and an incorrect prediction of the training image as being fake is given the first value (e.g., the "zero"). For instance, these values could be expressed as D(x̄,y or x,y)=

$$\begin{cases} 1, \text{when prediction equals "real"} \\ 0, \text{when prediction equals "fake"} \end{cases},$$

where "D(.)" is the prediction of the discriminator 720.

Other functions for "D(.)" can be used. For instance, "D(.)" can output a real value (e.g., between zero and one) indicating a likelihood of a real or fake image. The discriminator 720 is trained according to a loss function $\mathcal{L}_D$ defined such that the discriminator 720 can attempt to discriminate between real and fake images (e.g., a real image being one of the training images 602 and a fake image being a synthesized image by the generator 710 based on a sample code vector). In an example, the loss function $L_D$ is expressed as $\mathcal{L}_D=(D(x,y)-1)^2+D(\bar{x},y)^2$.

Referring back to the loss function $\mathcal{L}_G$ of the generator 710, the first loss term includes the encoder's 702 loss function $\mathcal{L}_E$. The second loss term is computed by allocating the second value (e.g., the "one") to a prediction of the discriminator 720 that the fake image is fake, thereby reflecting the strategy of training the generator 710 to learn to fool the discriminator 720. As such, the loss function $L_G$ is expressed as $\mathcal{L}_G=\mathcal{L}_E+(D(\bar{x},y)-1)^2$. FIG. 7 illustrates this second loss term with a dashed arrow from fake/real predictions 722 of to the generator 710.

An example of the generator's 710 architecture is outlined in table 1. An example of the discriminator's 720 architecture is outlined in table 2. The main structure of these networks follows the architectures, with a few variations, described in "Progressive growing of gans for improved quality, stability, and variation," to Tero Karras et al., in arXiv preprint arXiv:1710.10196 (2017), the content of which is incorporated herein by reference in its entirety. The variations include using feature maps that are smaller and, instead of using non-parametric up-sampling followed by an extra convolution, the up-sampling is performed with fractionally strided convolutions. The encoder 702 follows the structure of the discriminator 720 but does not use minibatch discrimination, and the output shape is adjusted to the size of the latent space 708 instead of producing a scalar output.

TABLE 1

| Operation | Output Shape | Stride |
|---|---|---|
| Input | 128 × 1 × 1 | 1 |
| Conv 4 × 4 | 128 × 4 × 4 | 1 |
| Conv 3 × 3 | 128 × 4 × 4 | 1 |
| Transpose Conv 2 × 2 | 128 × 8 × 8 | 2 |
| Conv 3 × 3 | 112 × 8 × 8 | 1 |
| Transpose Conv 2 × 2 | 112 16 × 16 | 2 |
| Conv 3 × 3 | 96 × 16 × 16 | 1 |
| Transpose Conv 2 × 2 | 96 × 32 × 32 | 2 |
| Conv 3 × 3 | 80 × 32 × 32 | 1 |
| Transpose Conv 2 × 2 | 80 × 64 × 64 | 2 |
| Conv 3 × 3 | 64 × 64 × 64 | 1 |
| Transpose Conv 2 × 2 | 64 × 128 × 128 | 2 |
| Conv 3 × 3 | 32 × 128 × 128 | 1 |
| Transpose Conv 2 × 2 | 32 × 256 × 256 | 2 |
| Conv 3 × 3 | 16 × 256 × 256 | 1 |
| Conv 1 × 1 | 2 × 256 × 256 | 1 |

TABLE 2

| Operation | Output Shape | Stride |
|---|---|---|
| Input | 2 × 256 × 256 | 1 |
| Conv 1 × 1 | 16 × 256 × 256 | 1 |
| Conv 3 × 3 | 32 × 256 × 256 | 1 |
| Conv 2 × 2 | 32 × 128 × 128 | 2 |
| Conv 3 × 3 | 64 × 128 × 128 | 1 |
| Conv 2 × 2 | 64 × 64 × 64 | 2 |
| Conv 3 × 3 | 80 × 64 × 64 | 1 |
| Conv 2 × 2 | 80 × 32 × 32 | 2 |
| Conv 3 × 3 | 96 × 32 × 32 | 1 |
| Conv 2 × 2 | 96 × 16 × 16 | 2 |
| Conv 3 × 3 | 112 × 16 × 16 | 1 |
| Conv 2 × 2 | 112 × 8 × 8 | 2 |
| Conv 3 × 3 | 112 × 8 × 8 | 1 |
| Conv 2 × 2 | 128 × 4 × 4 | 2 |
| Minibatch stddev Conv 3 × 3 | 128 × 4 × 4 | 1 |
| Conv 4 × 4 | 128 × 1 × 1 | 1 |
| Fully connected | 1 × 1 | 1 |

Figure 8:
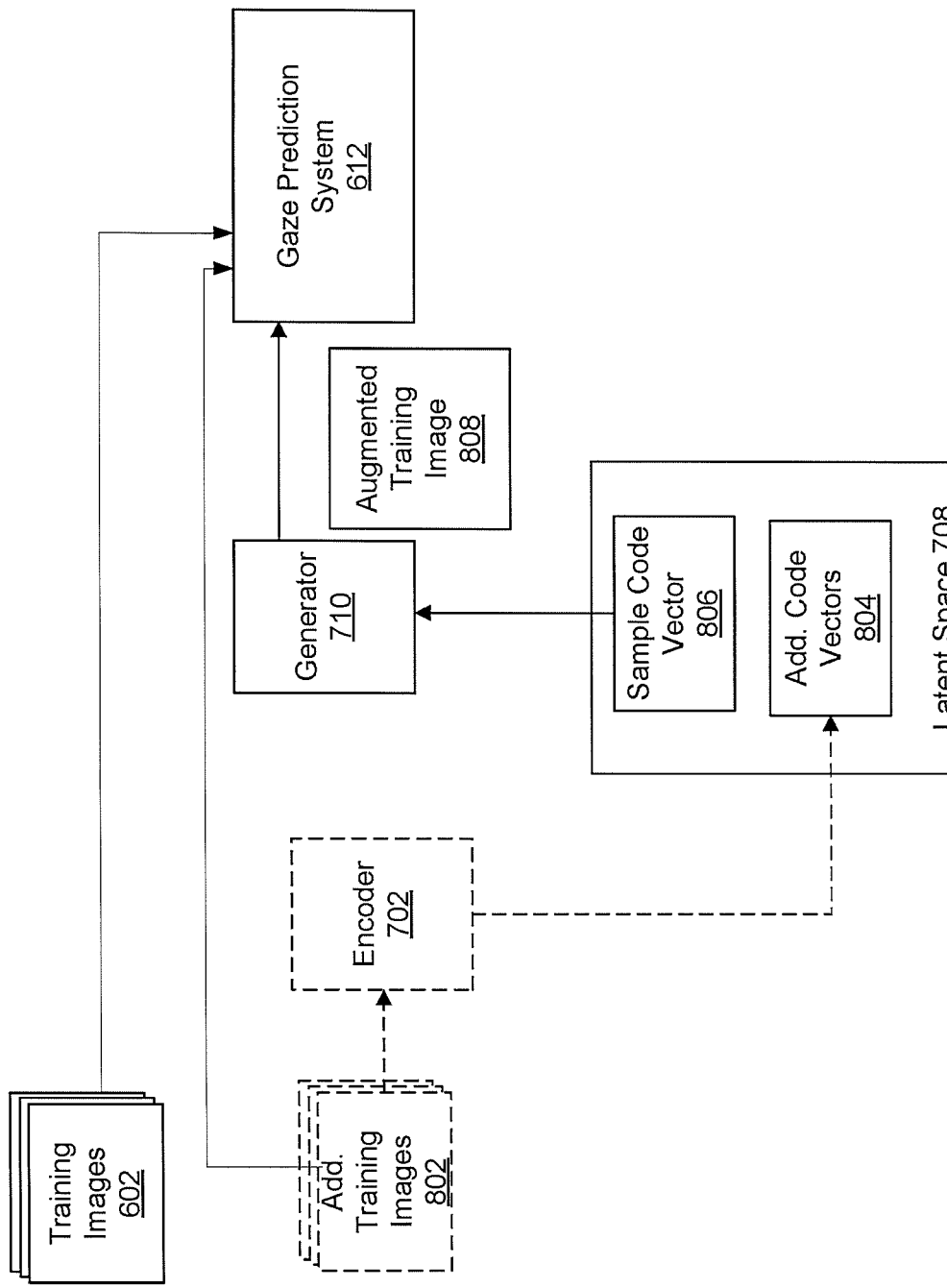
FIG. 8 depicts an example of training a gaze prediction system, in accordance with an embodiment.

FIG. 8 depicts an example of training the gaze prediction system 612, in accordance with an embodiment. The gaze prediction system 612 is implemented as convolutional neural network and is trained to predict gaze information.

In an example, the convolutional neural network is trained upon the completion of the training of the encoder 702, generator 710, and discriminator 720. During the training of the convolutional neural network, the discriminator 720 need no longer be used. Similarly, the encoder 702 need no longer be used. Nonetheless, it is possible to keep using this encoder 702 to generate additional code vectors 804 from additional training images 802 that were not used during the training of the AEGAN. These additional code vectors 804 are mapped to the latent space 708 and can be used to support the creation of sample code vectors for use by the generator 710. If the additional training images are available, these training images 802 and the original training images 602 are input to the convolutional neural network during its training.

In addition, the training of the convolutional neural network relies on the trained generator 710. In particular, upon completion of the AEGAN's training, sample code vectors are generated from the latent space 708 (based on the normal distribution "N(0,1)" or some other sampling method, such as one that randomly selects elements from code vectors and introduce noise or perturbation around each element). The generator 710 generates an augmented training image 808 from each sample code vector 806. The augmented training images are input to the convolutional neural network during the training of this network. If each code vector mapped to the latent space 708 encodes a training image "x" and an annotation "y," each augmented training image 808 also represents a synthesized training image and a synthesized annotation.

Figure 9:
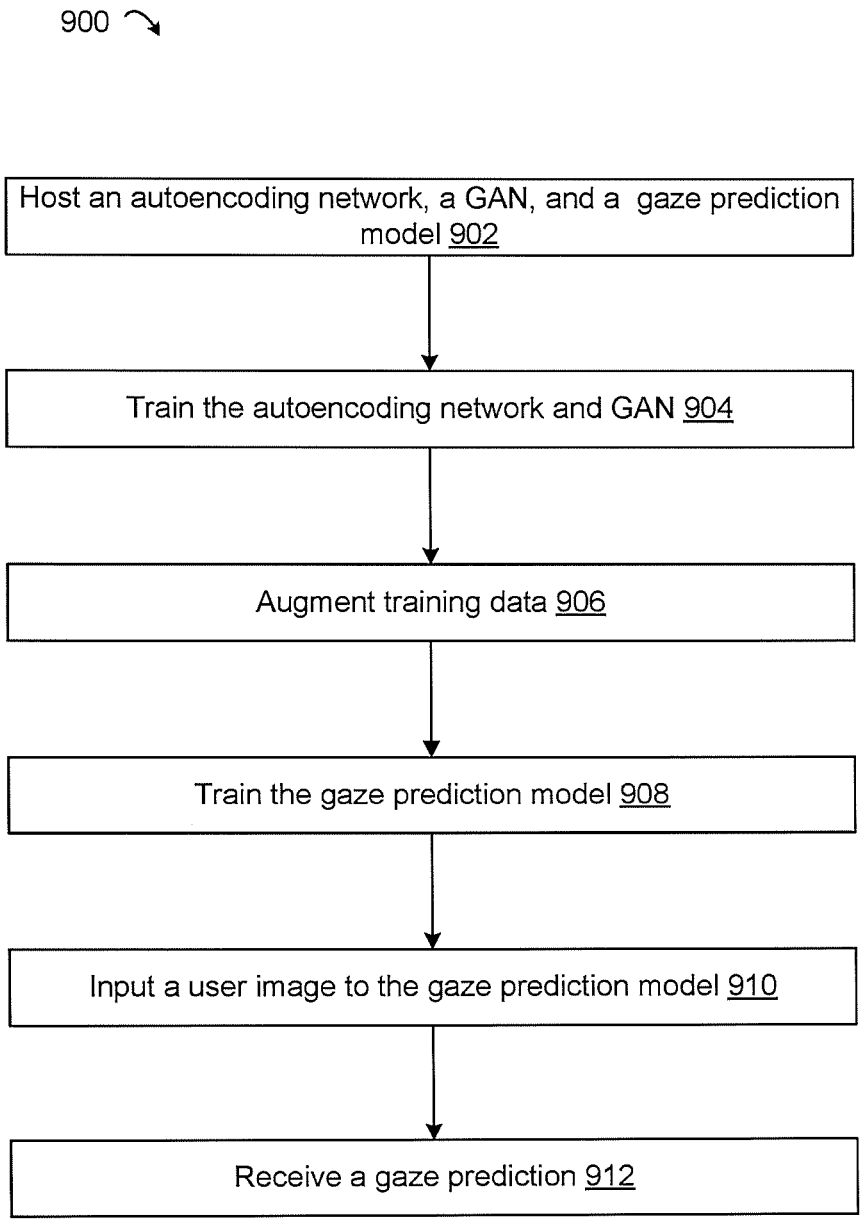
FIG. 9 illustrates an example of a flow for using an AEGAN and a gaze prediction model, in accordance with an embodiment.
Figure 10:
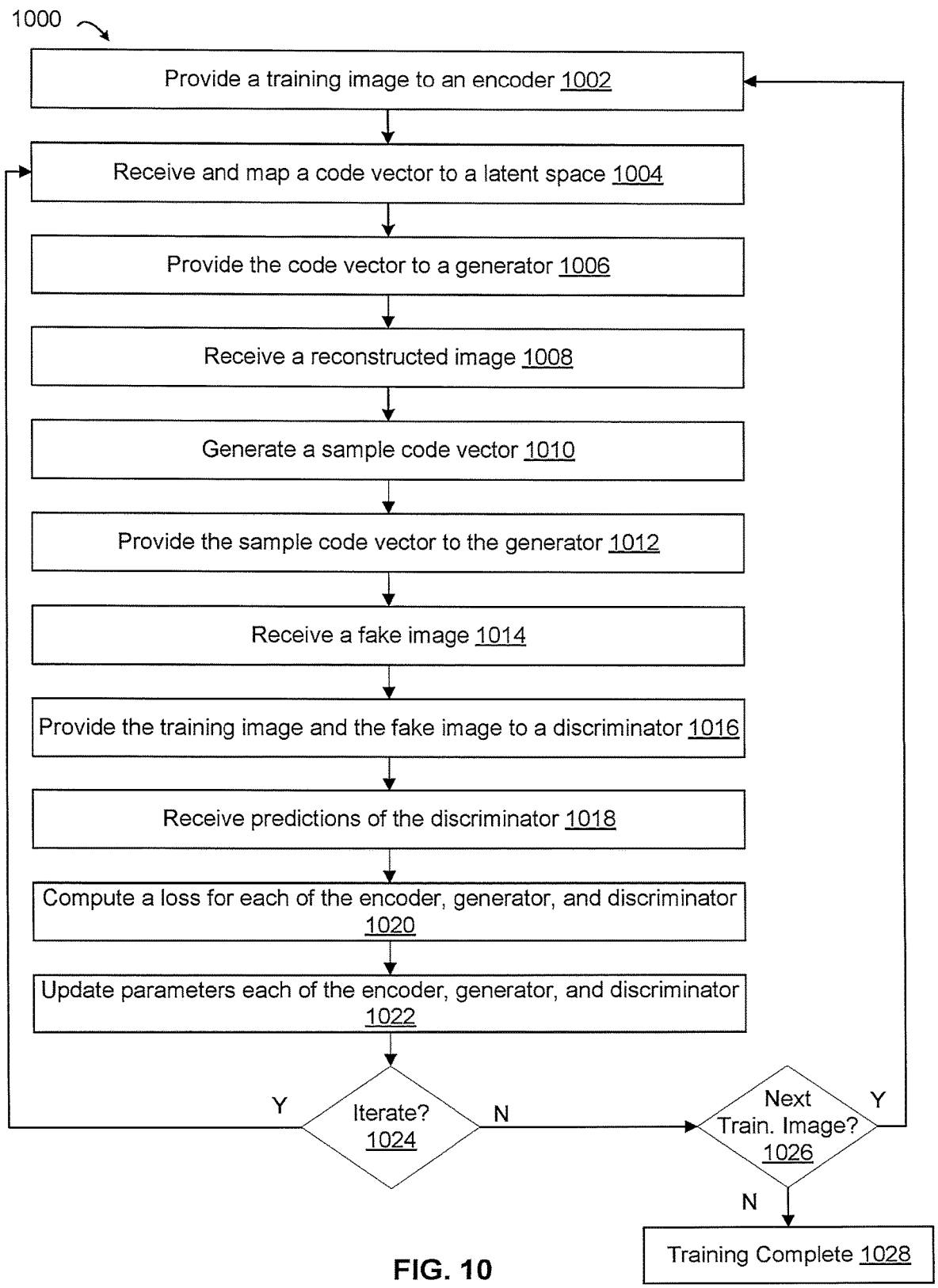
FIG. 10 illustrates an example of a flow for training the AEGAN, in accordance with an embodiment.

FIGS. 9-10 illustrate example flows for using an AEGAN to train a discriminative model, such as a gaze prediction model. Instructions for performing the operations of the flows can be stored as computer-readable instructions on a non-transitory computer-readable medium of a computer system. In an example, the computer system corresponds to the computer server 530 or the computing device 520 of FIG. 1, or may be distributed between the computer server 530 and the computing device 520, As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

FIG. 9 illustrates an example of a flow 900 for using the AEGAN and the gaze prediction model, in accordance with an embodiment. The flow 900 start at operation 902, where the computer system hosts an autoencoding network, a GAN, and a gaze prediction model. In an example, the computer stores computer-readable instructions that code the autoencoding network, GAN, and gaze prediction model. The autoencoding network and GAN form the AEGAN and share a decoder. The Autoencoding network also includes an encoder, while the GAN includes a discriminator. The gaze prediction model includes a convolutional neural network.

At operation 904, the computer system trains the autoencoding network and GAN. In an example, the computer system accesses original, real training images and the autoencoding network and GAN are trained simultaneously based on these images. For instance, the computer system inputs these images to the encoder that learns how to generate code vectors from them. The computer system maps these code vectors to a latent space. The generator learns how to synthesize training images based on the data distribution in the latent space. The discriminator learns how to discriminate between the original, real training images and fake images (e.g., images synthesized by the generator based on the data distribution).

At operation 906, the computer system augments the training data. In an example, upon completion of the training of the autoencoding network and GAN, the generator generates augmented training images based on sampling of the data distribution from the latent space. The computer system stores the augmented training images in addition to the original, real training images in the memory. The augmented training images and, the original, real training images form a training dataset available to train the gaze prediction model.

At operation 908, the computer system trains the gaze prediction model. In an example, images from the training dataset are input to the gaze prediction model and are used to compute a loss function of the gaze prediction model. The parameters of the gaze prediction model are updated through backpropagation to minimize the loss function.

At operation 910, the computer system inputs a user image to the gaze prediction model. In an example, upon completion of the training of the gaze prediction system, the computer system receives the user image. This image shows at least an eye of a user.

At operation 912, the computer system receives a prediction of a user gaze based on the user image. In an example, the computer system receives the prediction from the gaze prediction system in response to inputting the user image. The type of and information contained in the gaze prediction depends on the training of the gaze prediction model. For instance, if this training is to locate a pupil in the user image, the gaze prediction includes location information about the pupil. The computer system outputs the gaze prediction to a gaze-based application for use by this application.

FIG. 10 illustrates an example of a flow 1000 for training the AEGAN, in accordance with an embodiment. The flow starts at operation 1002, where the computer system provides a training image to the encoder. In an example, the computer system inputs a subset of the original, real training images to the encoder. The subset can consist of one training image or, for batch training, can include a plurality of training images (e.g., eight training images). For batch training, the operations described herein below are repeated for each training image in the batch.

At operation 1004, the computer system receives and maps a code vector to a latent space. In an example, the encoder generates the code vector based on the training image. In addition, the training image may be associated with an annotation. The code vector also includes latent information about the annotation in this case. The computer system receives the code vector from the encoder and stores its elements as elements of the latent space.

At operation 1006, the computer system provides the code vector to the generator. In an example, the computer system inputs the code vector to the generator.

At operation 1008, the computer system receives a reconstructed image from the generator. In an example, the generator generates the reconstructed image based on the code vector.

At operation 1010, the computer system generates a sample code vector. In an example, the computer system samples the data distribution of the latent space and generates the sample code vector accordingly.

At operation 1012, the computer system provides the sample code vector to the generator. In an example, the computer system inputs the sample code vector to the generator.

At operation 1014, the computer system receives a fake image from the generator. In an example, the generator generates the fake image based on the sample code vector.

At operation 1016, the computer system provides the training image (or any other training image) and the fake image to the discriminator. In an example, the computer system inputs these two images to the discriminator.

At operation 1018, the computer system receives predictions of the discriminator based on the training image and the fake image. In an example, the discriminator generates a first prediction of whether the training image is real or fake and a second prediction of whether the fake image is real or fake.

At operation 1020, the computer system computes a loss for each of the encoder, generator, and discriminator. In an example, the loss $\mathcal{L}_E$ of the encoder is computed based on a comparison of the training image and a reconstructed image. This comparison can be a similarity comparison that uses a Manhattan distance or a Euclidian distance. In addition, the loss $\mathcal{L}_E$ of the encoder can include a drift loss term to confine the code vectors to a compact subspace of the latent space. In an illustration, the loss $\mathcal{L}_E$ of the encoder is expressed as $\mathcal{L}_E=|(x,y)-(\hat{x},y)+\text{ReLU}(|z|-1)$. In an example, the loss $\mathcal{L}_D$ of the decoder depends on the accuracy of the predictions. For instance, a correct prediction is allocated a zero value (or some other low value) and an incorrect prediction is allocated a one value (or some other high value). In an illustration, the loss $\mathcal{L}_D$ of the decoder is expressed as $\mathcal{L}_D=(D(x,y)-1)^2+D(\bar{x},y)^2$. In an example, the loss $\mathcal{L}_G$ of the generator includes a first loss term associated with the training of the encoder and a second loss term associated with the training of the generator such that the generator learns how to synthesize images from the latent space and fool the discriminator into predicting that these images are real. In an illustration, the loss $\mathcal{L}_G$ of the generator is expressed as $\mathcal{L}_G=\mathcal{L}_E+(D(\bar{x},y)-1)^2$, where "$\mathcal{L}_E$" corresponds to the first loss term and "$(D(\bar{x},y)-1)^2$" corresponds to the second loss term.

At operation 1022, the computer system updates the parameters of each of the encoder, generator, and discriminator. In an example, the parameters of the encoder are updated based on the loss $\mathcal{L}_E$ of the encoder. Similarly, the parameters of the encode and discriminator are updated based on the loss $\mathcal{L}_G$ of the generator and the loss $\mathcal{L}_D$ of the discriminator, respectively. The parameters of each of these artificial neural networks are updated based on backpropagation that relies on a gradient descent such that the respective loss is reduced between iterations. In another example, not all the networks are updated per iteration. This approach reflects the strategy of decoupling the training of the networks. For instance, a subset of the networks (e.g., the generator) is updated based on the subset of images while the remaining network(s) are not updated in an iteration. Thereafter, a next subset of images is input during the training to update the remaining network(s) and so on and so forth.

At operation 1024, the computer system determines whether operations 1004-1022 should be performed again based on the training image in a next iteration. In an example, the computer system maintains a counter that counts the number of iterations already performed based on the training image. In addition, the computer system can measure a convergence criterion, such as the change to each loss between the iterations. If the counter reaches a maximum number of iterations or the convergence criterion is met (e.g., the change to each loss function between iterations is less than a threshold amount), the computer system loops back to operation 1004. Otherwise, operation 1026 follows operation 1024.

At operation 1026, the computer system determines whether a next training image is available or not. In an example, if all the available training images (or a certain number of them, where this number exceeds a threshold number) have been used in the training, operation 1028 follows operation 1026, where the computer system declares the training to be complete. Otherwise, the computer system loops back to operation 1002, where the computer system selects the next training image and provides it to the encoder.

Operation 1028 can also include generating augmented training data. In an example, the training of the AEGAN is complete. The computer system generates sample code vectors based on the latent space and inputs these code vectors to the generator. In response the generator generates the augmented training images and the computer system stores these images.

Figure 11:
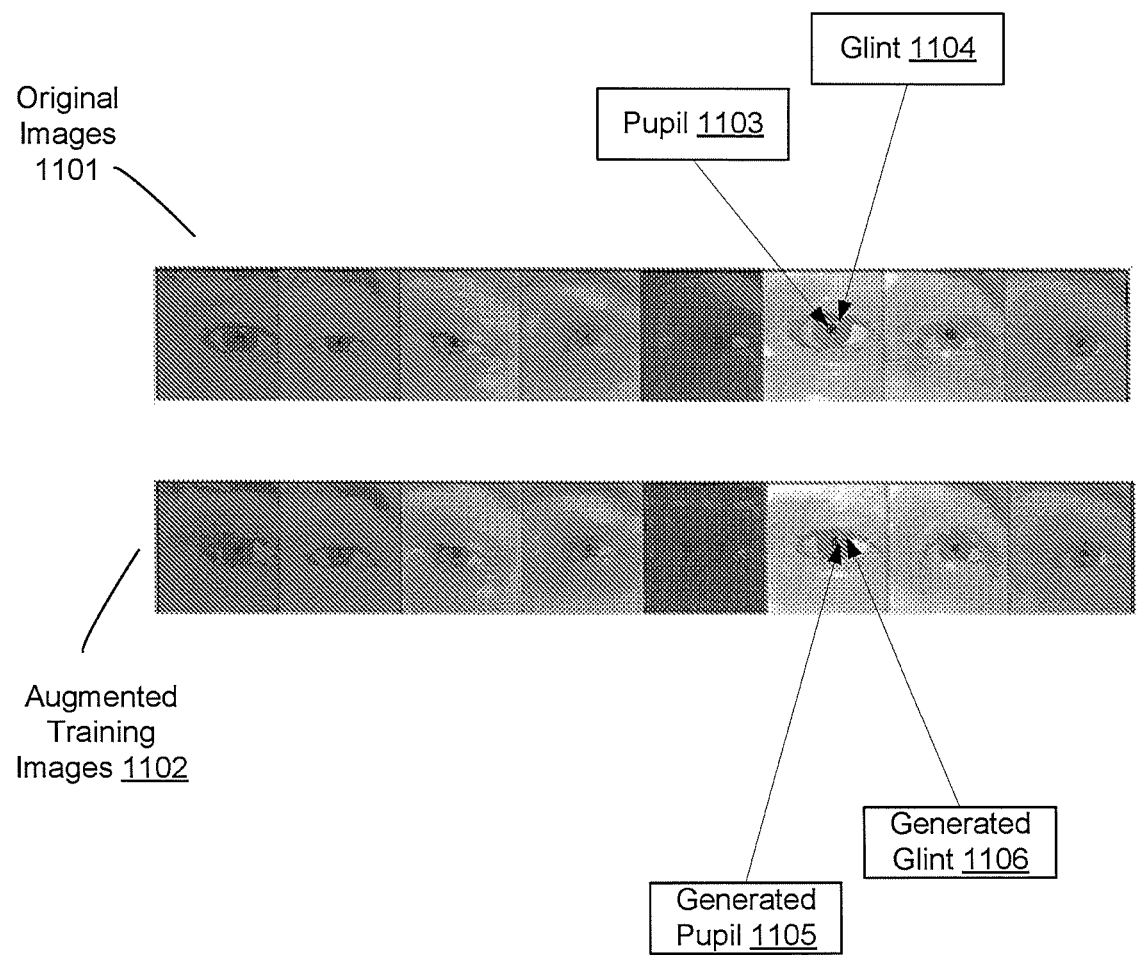
FIG. 11 is an example of experimental data illustrating a set of original images and a set of decoded images using an AEGAN, according to an embodiment.

FIG. 11 is an example of experimental data illustrating a set of original, real training images 1101 and a set of augmented training images 1102 generated by a generator of an AEGAN, in accordance according to an embodiment. As illustrated, in the original, real training images 1101, each image may be characterized by a pupil 1103 and a glint 1104 (referenced in one image of the series). In comparison, the augmented training images 1102 have high quality and are diverse (e.g., comparable to the original, real training images 1101). For instance, the augmented training images 1102 show a generated pupil 1105 and a generated glint 1106 (referenced in one image of the series).

The disclosure has now been described in detail for the purposes of clarity and understanding. However, it will be appreciated that certain changes and modifications may be practiced within the scope of the appended claims.

The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instructions) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for gaze prediction, the method being implemented on a computer system and comprising:
   providing, to a gaze prediction model, a user image that shows at least a user eye; and
   receiving, from the gaze prediction model, a prediction of a user gaze based on the user image,
   wherein:
   the gaze prediction model is trained based on an augmented training image that is generated by a generator network,
   the generator network is trained to generate the augmented training image based on a training of an autoencoder network and a generative adversarial network,
   the autoencoder network comprises the generator network and an encoder network,
   the generative adversarial network comprises the generator network and a discriminator network,
   a loss function for training the generator network comprises a first loss term associated with training the encoder network and a second loss term associated with training the generative adversarial network, and
   the training of the autoencoder network and the generative adversarial network comprises:
   providing, to the encoder network, a training image;
   mapping, to a latent space, a code vector that is generated by the encoder network based on the training image;

computing a loss of the encoder network based on a comparison of the training image and a reconstructed image, wherein the reconstructed image is generated by the generator network based on the code vector;

updating parameters of the encoder network based on the loss of the encoder network;

providing, to the discriminator network, the training image and a fake image, wherein the fake image is generated by the generator network based on the latent space;

computing a loss of the discriminator network based on predictions of the discriminator network whether each of the training image and the fake image is real or fake; and updating parameters of the discriminator network based on the loss of the discriminator network.

2. The method of claim 1, wherein the training of the autoencoder network and the generative adversarial network further comprises:

computing the loss of the generator network based on the first loss term associated with training the encoder network and the second loss term associated with training the generative adversarial network; and updating parameters of the generator network based on the loss of the generator network, wherein the first loss term comprises the loss of the encoder network.

3. The method of claim 2, wherein the loss of the discriminator network is computed by allocating a zero to a prediction of the discriminator network that the fake image is fake, and wherein the second loss term used to compute the loss of the generator network is computed by allocating a one to a prediction of the discriminator network that the fake image is fake.

4. The method of claim 2, wherein the loss of the encoder network comprises a drift loss term that confines the code vector to a compact subspace of the latent space.

5. The method of claim 2, wherein the training image is associated with an annotation, and wherein the code vector is generated by the encoder network based further on the annotation of the training image.

6. The method of claim 1, wherein the training of the autoencoder network and the generative adversarial network comprises adding code vectors to a latent space, wherein the code vectors are generated by the encoder network based on a plurality of original training images, and wherein the augmented training image is generated by the generator network based on a sampling of code elements from the latent space upon completion of the training of the autoencoder network and the generative adversarial network.

7. The method of claim 6, further comprising:

upon the completion of the training of the autoencoder network and the generative adversarial network:

providing, to the encoder network, a new training image, wherein the new training image was not previously used during the training of the autoencoder network and the generative adversarial network; and mapping, to the latent space, a code vector that is generated by the encoder network based on the new training image.

8. The method of claim 6, wherein the gaze prediction model comprises a neural network, and further comprising:

upon the completion of the training of the autoencoder network and the generative adversarial network:

receiving a plurality of augmented training images generated by the generator network based on the latent space; and training the neural network based on the plurality of original training images and the plurality of augmented training images.

9. A computer system comprising:

one or more processors; and one or more non-transitory computer-readable media comprising instructions that, upon execution by the one or more processors, configure the computer system to host an autoencoder network and a generative adversarial network, wherein:

the autoencoder network comprises an encoder network and a generator network, the generative adversarial network comprises the generator network and a discriminator network, a loss function for training the generator network comprises a first loss term associated with training the encoder network and a second loss term associated with training the generative adversarial network, and the instructions further configure the computer system to perform a training of the autoencoder network and the generative adversarial network, wherein the training of the autoencoder network and the generative adversarial network comprises:

providing, to the encoder network, training data;

mapping, to a latent space, a code vector that is generated by the encoder network based on the training data;

computing a loss of the encoder network based on a comparison of the training data and reconstructed data, wherein the reconstructed data is generated by the generator network based on the code vector;

updating parameters of the encoder network based on the loss of the encoder network;

providing, to the discriminator network, the training data and fake data, wherein the fake data is generated by the generator network based on the latent space;

computing a loss of the discriminator network based on predictions of the discriminator network whether each of the training data and the fake data is real or fake; and updating parameters of the discriminator network based on the loss of the discriminator network.

10. The computer system of claim 9, wherein the instructions further configure the computer system to host a gaze prediction model and:

provide, to the gaze prediction model, a user image that shows at least a user eye; and receive, from the gaze prediction model, a prediction of a user gaze based on the user image to the gaze prediction model, wherein:

the gaze prediction model is trained based on an augmented training image that is generated by the generator network, the generator network is trained to generate the augmented training image based on a training of the autoencoder network and the generative adversarial network.

11. The computer system of claim 9, wherein the training of the autoencoder network and the generative adversarial network comprises:

computing the loss of the generator network based on the first loss term associated with training the encoder network and the second loss term associated with training the generative adversarial network; and updating parameters of the generator network based on the loss of the generator network, wherein the first loss term comprises the loss of the encoder network.

12. The computer system of claim 11, wherein the loss of the discriminator network is computed by allocating a zero to a prediction of the discriminator network that the fake data is fake, and wherein the second loss term used to compute the loss of the generator network is computed by allocating a one to a prediction of the discriminator network that the fake data is fake.

13. The computer system of claim 11, wherein the loss of the encoder network comprises a drift loss term that confines the code vector to a compact subspace of the latent space.

14. The computer system of claim 11, wherein the training data is associated with an annotation, and wherein the code vector is generated by the encoder network based further on the annotation of the training data.

15. One or more non-transitory computer-readable media comprising instructions that, upon execution on a computer system, configure the computer system to perform operations comprising:
   hosting an autoencoder network and a generative adversarial network, wherein: the autoencoder network comprises an encoder network and a generator network, and the generative adversarial network comprises the generator network and a discriminator network; and
   training the autoencoder network and the generative adversarial network, wherein a loss function for training the generator network comprises a first loss term associated with training the encoder network and a second loss term associated with training the generative adversarial network, wherein the training further comprises:
   providing, to the encoder network, a training image;
   mapping, to a latent space, a code vector that is generated by the encoder network based on the training image;
   computing a loss of the encoder network based on a comparison of the training image and a reconstructed image, wherein the reconstructed image is generated by the generator network based on the code vector;
   updating parameters of the encoder network based on the loss of the encoder network;
   providing, to the discriminator network, the training image and a fake image, wherein the fake image is generated by the generator network based on the latent space;
   computing a loss of the discriminator network based on predictions of the discriminator network whether each of the training image and the fake image is real or fake; and
   updating parameters of the discriminator network based on the loss of the discriminator network.

16. The one or more non-transitory computer-readable media of claim 15, wherein the training of the autoencoder network and the generative adversarial network comprises adding code vectors to a latent space, wherein the code vectors are generated by the encoder network based on a plurality of original training images, and wherein the operations further comprise:
   upon completion of the training of the autoencoder network and the generative adversarial network:
   receiving a plurality of augmented training images that are generated by the generator network based on the latent space; and
   training a gaze prediction model based on the plurality of original training images and the plurality of augmented training images.

* * * * *